United States Patent
Tsuneki et al.

(10) Patent No.: US 10,901,374 B2
(45) Date of Patent: Jan. 26, 2021

(54) MACHINE LEARNING DEVICE, CONTROL DEVICE, AND MACHINE LEARNING METHOD

(71) Applicant: FANUC CORPORATION, Yamanashi (JP)

(72) Inventors: Ryoutarou Tsuneki, Yamanashi (JP); Satoshi Ikai, Yamanashi (JP); Naoto Sonoda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 10 days.

(21) Appl. No.: 16/435,840

(22) Filed: Jun. 10, 2019

(65) Prior Publication Data

US 2020/0026248 A1 Jan. 23, 2020

(30) Foreign Application Priority Data

Jul. 17, 2018 (JP) ................. 2018-134352

(51) Int. Cl.
*G05B 13/02* (2006.01)
(52) U.S. Cl.
CPC ................. *G05B 13/0265* (2013.01)
(58) Field of Classification Search
CPC ...... G05B 2219/34013; G05B 13/0265; G05B 2219/41153
See application file for complete search history.

(56) References Cited

U.S. PATENT DOCUMENTS

| 2002/0107858 | A1* | 8/2002 | Lundahl | ............... | G06K 9/6247 |
| 2009/0222109 | A1* | 9/2009 | Takagi | ............... | G05B 13/0265 700/44 |

(Continued)

FOREIGN PATENT DOCUMENTS

| JP | 2003-23785 | 1/2003 |
| JP | 2015-213714 | 12/2015 |

(Continued)

OTHER PUBLICATIONS

R. C. Nongpiur, D. J. Shpak and A. Antoniou, "Improved Design Method for Nearly Linear-Phase IIR Filters Using Constrained Optimization," in IEEE Transactions on Signal Processing, vol. 61, No. 4, pp. 895-906, Feb. 15, 2013, doi: 10.1109/TSP.2012.2231678. (Year: 2013).*

Ken Kouno et al., "Irreducibility of stable rational transfer functions and its application IIR filter design", Proc. of the 24th SIP Symposium, Nov. 2009, p. 249-254 (with English language abstract).

*Primary Examiner* — Mohammad Ali
*Assistant Examiner* — Vincent W Chang
(74) *Attorney, Agent, or Firm* — Wenderoth, Lind & Ponack, L.L.P.

(57) ABSTRACT

The settling time of machine learning is shortened. A machine learning device is configured to perform machine learning related to optimization of coefficients of a transfer function of an IIR filter of a feedforward calculation unit with respect to a servo control device configured to control a servo motor configured to drive an axis of a machine tool, a robot, or an industrial machine using feedforward control by a feedforward calculation unit having the IIR filter. The machine learning device represents a zero-point at which the transfer function of the IIR filter is zero and a pole at which the transfer function diverges infinitely in polar coordinates using a radius r and an angle θ, respectively, and searches for and learns, within a predetermined search range, the radius r and the angle θ to thereby perform the optimization of the coefficients of the transfer function of the IIR filter.

14 Claims, 8 Drawing Sheets

(56) References Cited

U.S. PATENT DOCUMENTS

| | | | |
|---|---|---|---|
| 2013/0200835 A1* | 8/2013 | Sekiguchi | H02P 29/50 |
| | | | 318/490 |
| 2017/0089043 A1* | 3/2017 | Chang | E02F 3/435 |
| 2018/0331740 A1* | 11/2018 | Orhan | H04B 17/102 |
| 2020/0192303 A1* | 6/2020 | Saito | B25J 9/1651 |

FOREIGN PATENT DOCUMENTS

| | | |
|---|---|---|
| JP | 2015-230617 | 12/2015 |
| JP | 2017-84104 | 5/2017 |
| JP | 2017-117366 | 6/2017 |

* cited by examiner

MACHINE LEARNING DEVICE, CONTROL DEVICE, AND MACHINE LEARNING METHOD

This application is based on and claims the benefit of priority from Japanese Patent Application No. 2018-134352, filed on 17 Jul. 2018, the content of which is incorporated herein by reference.

BACKGROUND OF THE INVENTION

Field of the Invention

The present invention relates to a machine learning device that performs machine learning related to optimization of a coefficient of an infinite impulse response (IIR) filter with respect to a servo control device that controls a servo motor that drives an axis of a machine tool, robot, or an industrial machine using feedforward control of a feedforward calculation unit that has the IIR filter and relates to a control device including the machine learning device and a machine learning method.

Related Art

A servo control device which uses feedforward control of a feedforward calculation unit having an IIR filter is disclosed in Patent Document 1, for example. Patent Document 1 discloses an invention related to a control device of a servo motor and discloses that a velocity feedforward unit (corresponding to a position feedforward calculation unit of the present embodiment to be described later) includes a velocity feed calculator (corresponding to a differentiator of the present embodiment to be described later) and a velocity feedforward filter, and an IIR filter may be used as the velocity feedforward filter (see paragraph and the like).

Patent Document 1: Japanese Unexamined Patent Application, Publication No. 2003-23785

SUMMARY OF THE INVENTION

Patent Document 1 discloses feedforward control which uses an IIR filter but does not disclose machine learning for optimizing a coefficient of a transfer function of an IIR filter.

An object of the present invention is to provide a machine learning device capable of shortening the settling time of machine learning for optimizing a coefficient of a transfer function of an IIR filter with respect to a servo control device that controls a servo motor using feedforward control of a feedforward calculation unit that has the IIR filter and to provide a control device including the machine learning device and a machine learning method.

(1) A machine learning device according to the present invention is a machine learning device (for example, a machine learning device 200 to be described later) configured to perform machine learning related to optimization of coefficients of a transfer function of an IIR filter with respect to a servo control device (for example, a servo control device 100 to be described later) configured to control a servo motor (for example, a servo motor 300 to be described later) configured to drive an axis of a machine tool, a robot, or an industrial machine using feedforward control by a feedforward calculation unit (for example, a velocity feedforward calculation unit 109 or a position feedforward calculation unit 110 to be described later) having the IIR filter (for example, an IIR filter 1092 or 1102 to be described later), wherein the machine learning device represents a zero-point at which the transfer function of the IIR filter is zero and a pole at which the transfer function diverges infinitely in polar coordinates using a radius r and an angle $\theta$, respectively, and searches for and learns, within a predetermined search range, the radius r and the angle $\theta$ to thereby perform the optimization of the coefficients of the transfer function of the IIR filter.

(2) In the machine learning device according to (1), the search range of the radius r may be defined on the basis of an attenuation factor, and the search range of the angle $\theta$ may be defined on the basis of a vibration suppression frequency.

(3) In the machine learning device according to (1) or (2), the searching of the zero-point may be performed prior to the searching of the pole.

(4) In the machine learning device according to any one of (1) to (3), the pole may be fixed when searching for the zero-point.

(5) In the machine learning device according to any one of (1) to (4), the searching of the angle $\theta$ may be performed prior to the searching of the radius r.

(6) In the machine learning device according to any one of (1) to (5), the radius r may be fixed to a fixed value when searching for the angle $\theta$.

(7) In the machine learning device according to any one of (1) to (6), the zero-point may be represented by a complex number and a conjugate complex number thereof.

(8) In the machine learning device according to any one of (1) to (7), the feedforward calculation unit may be a velocity feedforward calculation unit or a position feedforward calculation unit.

(9) In the machine learning device according to any one of (1) to (8), the feedforward calculation unit may be a velocity feedforward calculation unit, the machine learning device may further include a position feedforward calculation unit having an IIR filter, and the optimization of the transfer function of the IIR filter of the velocity feedforward calculation unit may be performed prior to the optimization of the transfer function of the IIR filter of the position feedforward calculation unit.

(10) The machine learning device according to any one of (1) to (9) may further include: a state information acquisition unit (for example, a state information acquisition unit 201 to be described later) configured to acquire, from the servo control device, state information including a servo state including at least a position error and a transfer function of the feedforward calculation unit by causing the servo control device to execute a predetermined machining program;
an action information output unit (for example, an action information output unit 203 to be described later) configured to output action information including adjustment information of the coefficients of the transfer function included in the state information to the servo control device;
a reward output unit (for example, a reward output unit 2021 to be described later) configured to output a value of a reward of reinforcement learning based on the position error included in the state information; and
a value function updating unit (for example, a value function updating unit 2022 to be described later) configured to update an action value function on the basis of the value of the reward output by the reward output unit, the state information, and the action information.

(11) In the machine learning device according to (10), the reward output unit may output the value of the reward on the basis of an absolute value of the position error.

(12) The machine learning device according to (10) or (11) may further include: an optimization action information output unit (for example, an optimization action information output unit 205 to be described later) configured to generate and output correction information of the coefficients of the transfer function of the feedforward calculation unit on the basis of the value function updated by the value function updating unit.

(13) A control device according to the present invention is a control device including: the machine learning device according to any one of (1) to (12); and a servo control device configured to control a servo motor configured to drive an axis of a machine tool, a robot, or an industrial machine using feedforward control by a feedforward calculation unit having an IIR filter.

(14) In the control device according to (13), the machine learning device may be included in the servo control device.

(15) A machine learning method according to the present invention is a machine learning method of a machine learning device (for example, a machine learning device 200 to be described later) configured to perform machine learning related to optimization of coefficients of a transfer function of an IIR filter with respect to a servo control device (for example, a servo control device 100 to be described later) configured to control a servo motor (for example, a servo motor 300 to be described later) configured to drive an axis of a machine tool, a robot, or an industrial machine using feedforward control by a feedforward calculation unit (for example, a velocity feedforward calculation unit 109 or a position feedforward calculation unit 110 to be described later) having the IIR filter (for example, an IIR filter 1092 or 1102 to be described later), wherein the machine learning method involves representing a zero-point at which the transfer function of the IIR filter is zero and a pole at which the transfer function diverges infinitely in polar coordinates using a radius r and an angle θ, respectively, and searching for and learning, within a predetermined search range, the radius r and the angle θ to thereby perform the optimization of the coefficients of the transfer function of the IIR filter.

According to the present invention, it is possible to shorten the settling time of machine learning for optimizing a coefficient of a transfer function of an IIR filter.

DETAILED DESCRIPTION OF THE INVENTION

Figure 1:
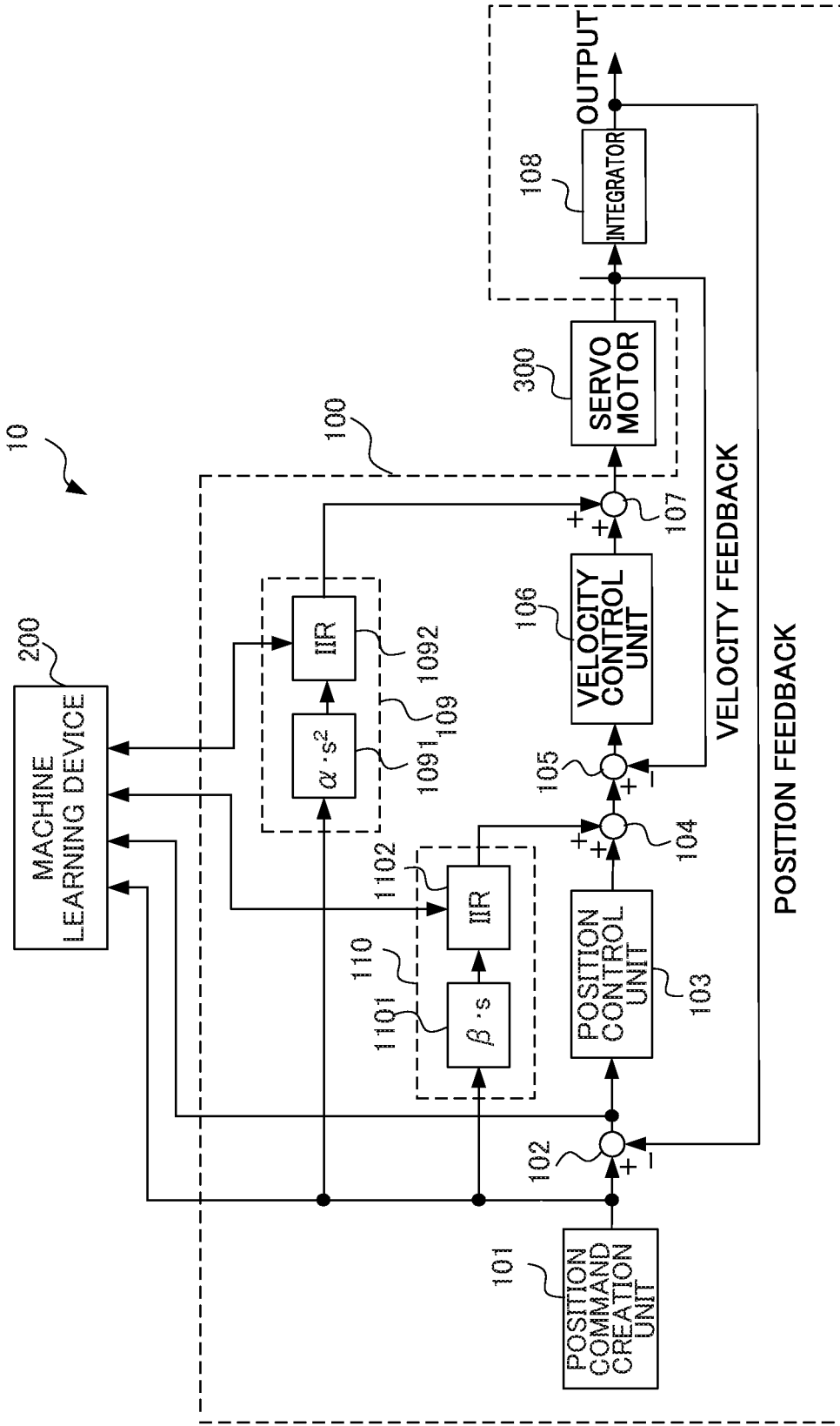
FIG. 1 is a block diagram illustrating a configuration example of a control device according to an embodiment of the present invention.

Hereinafter, an embodiment of the present invention will be described with reference to the drawings. FIG. 1 is a block diagram illustrating a configuration example of a control device according to an embodiment of the present invention. A control device 10 illustrated in FIG. 1 includes a servo control device 100 and a machine learning device 200.

A servo motor 300 is a control target of the servo control device 100 and is included in a machine tool, a robot, or an industrial machine, for example. The servo control device 100 may be provided as part of a machine tool, a robot, or an industrial machine together with the servo motor 300.

First, the servo control device 100 will be described. The servo control device 100 includes a position command creation unit 101, a subtractor 102, a position control unit 103, an adder 104, a subtractor 105, a velocity control unit 106, an adder 107, an integrator 108, a velocity feedforward calculation unit 109, and a position feedforward calculation unit 110. The velocity feedforward calculation unit 109 includes a double differentiator 1091 and an IIR filter 1092. Moreover, the position feedforward calculation unit 110 includes a differentiator 1101 and an IIR filter 1102.

The position command creation unit 101 creates a position command value and outputs the created position command value to the subtractor 102, the velocity feedforward calculation unit 109, the position feedforward calculation unit 110, and the machine learning device 200. The subtractor 102 calculates a difference between the position command value and a feedback detection position and outputs the difference to the position control unit 103 and the machine learning device 200 as a position error.

The position command creation unit 101 creates a position command value on the basis of a program for operating the servo motor 300. The servo motor 300 is included in a machine tool, for example. In a machine tool, when a table having a workpiece (a work) mounted thereon moves in an X-axis direction and a Y-axis direction, the servo control device 100 and the servo motor 300 illustrated in FIG. 1 are provided in the X-axis direction and the Y-axis direction, respectively. When the table is moved in directions of three or more axes, the servo control device 100 and the servo motor 300 are provided in the respective axis directions. The position command creation unit 101 sets a feed rate and creates a position command value so that a machining shape designated by the machining program is obtained.

The position control unit 103 outputs a value obtained by multiplying a position gain Kp by the position error to the adder 104 as a velocity command value.

The adder 104 adds the velocity command value and the output value (the position feedforward term) of the position feedforward calculation unit 110 and outputs an addition result to the subtractor 105 as a feedforward-controlled velocity command value. The subtractor 105 calculates a difference between the output of the adder 104 and a feedback velocity detection value and outputs the difference to the velocity control unit 106 as a velocity error.

The velocity control unit 106 adds a value obtained by multiplying and integrating an integral gain K1v by the velocity error and a value obtained by multiplying a proportional gain K2v by the velocity error and outputs an addition result to the adder 107 as a torque command value.

The adder 107 adds the torque command value and an output value (the velocity feedforward term) of the velocity feedforward calculation unit 109 and outputs the addition result to the servo motor 300 as a feedforward-controlled torque command value to drive the servo motor 300.

A rotational angular position of the servo motor 300 is detected by a rotary encoder serving as a position detection unit associated with the servo motor 300, and a velocity detection value is input to the subtractor 105 as a velocity feedback. The velocity detection value is integrated by the integrator 108 to be a position detection value, and the position detection value is input to the subtractor 102 as a position feedback.

The double differentiator 1091 of the velocity feedforward calculation unit 109 differentiates the position command value two times and multiplies a differentiation result by a constant α, and the IIR filter 1092 performs IIR filter process represented by a transfer function VFF(z) in Expression 1 (indicated by Math. 1 below) on the output of the double differentiator 1091 and outputs the processing result to the adder 107 as a velocity feedforward term. Coefficients $a_1$, $a_2$, $b_0$ to $b_2$ in Expression 1 are coefficients of the transfer function of the IIR filter 1092. Although the denominator and the numerator of the transfer function VFF(z) are quadratic functions in this example, the denominator and the numerator are not particularly limited to a quadratic function but may be a cubic function or a higher-order function.

$$VFF(z) = \frac{b_0 + b_1 z^{-1} + b_2 z^{-2}}{1 + a_1 z^{-1} + a_2 z^{-2}} \quad [\text{Math. 1}]$$

The differentiator 1101 of the position feedforward calculation unit 110 differentiates the position command value and multiplies a differentiation result by a constant R, and the IIR filter 1102 performs an IIR filter process represented by a transfer function PFF(z) in Expression 2 (indicated by Math. 2 below) on the output of the differentiator 1101 and outputs the processing result to the adder 104 as a position feedforward term. Coefficients $c_1$, $c_2$, and $d_0$ to $d_2$ in Expression 2 are the coefficients of the transfer function of the IIR filter 1102. Although the denominator and the numerator of the transfer function PFF(z) are quadratic functions in this example, the denominator and the numerator are not particularly limited to a quadratic function but may be a cubic function or a higher-order function.

$$PFF(z) = \frac{d_0 + d_1 z^{-1} + d_2 z^{-2}}{1 + c_1 z^{-1} + c_2 z^{-2}} \quad [\text{Math. 2}]$$

The servo control device 100 is configured in this manner.

Figure 2:
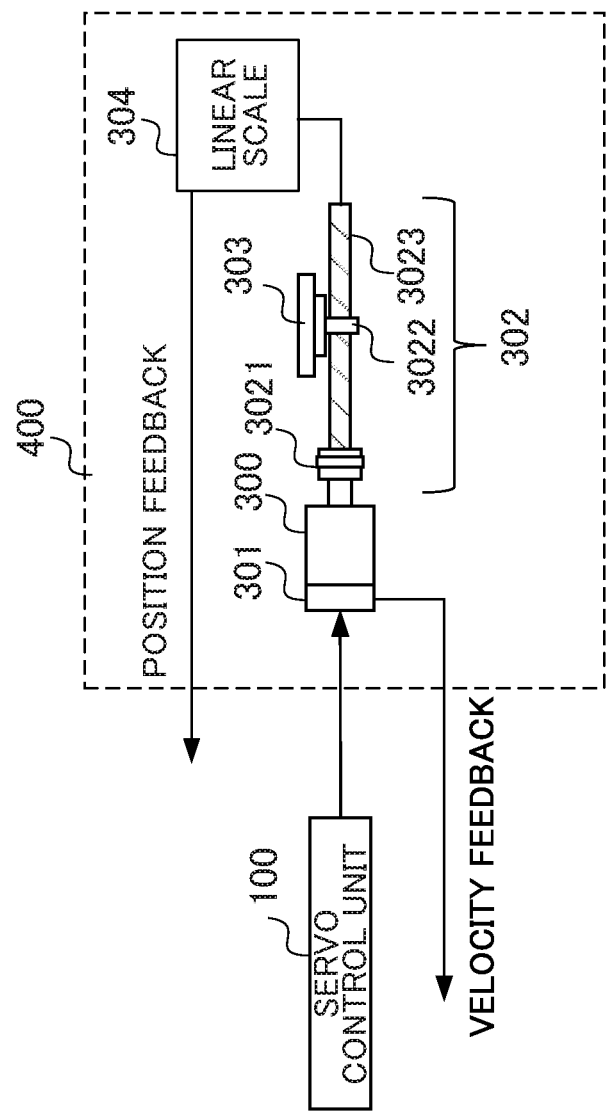
FIG. 2 is a block diagram illustrating a portion of a machine tool including a servo motor serving as an example of a control target of a servo control device.

Next, a control target 400 including the servo motor 300 controlled by the servo control device 100 will be described. FIG. 2 is a block diagram illustrating a portion of a machine tool including the servo motor 300, which is an example of the control target 400 of the servo control device 100. The servo control device 100 causes the servo motor 300 to move the table 303 with the aid of a coupling mechanism 302 to thereby machine a workpiece (a work) mounted on the table 303. The coupling mechanism 302 includes a coupling 3021 coupled to the servo motor 300 and a ball screw 3023 fixed to the coupling 3021, and a nut 3022 is screwed into the ball screw 3023. With rotation of the servo motor 300, the nut 3022 screwed into the ball screw 3023 moves in an axial direction of the ball screw 3023. With movement of the nut 3022, the table 303 moves.

A rotational angular position of the servo motor 300 is detected by the rotary encoder 301 serving as a position detection unit associated with the servo motor 300. As described above, the detected signal is used as a velocity feedback. The detected signal is integrated by the integrator 108 and is used as a position feedback. An output of a linear scale 304 attached to an end of the ball screw 3023 to detect a moving distance of the ball screw 3023 may be used as a position feedback. Moreover, a position feedback may be generated using an acceleration sensor.

<Machine Learning Device 200>

The machine learning device 200 learns the coefficients of the transfer function of the IIR filter 1092 of the velocity feedforward calculation unit 109 and the coefficients of the transfer function of the IIR filter 1102 of the position feedforward calculation unit 110 by executing a predetermined machining program (hereinafter also referred to as a "learning machining program"). Here, a machining shape designated by the learning machining program is an octagon or a shape in which the corners of an octagon are alternately replaced with arcs. Here, the machining shape designated by the learning machining program is not limited to these machining shapes but may be other machining shapes.

Figure 3:
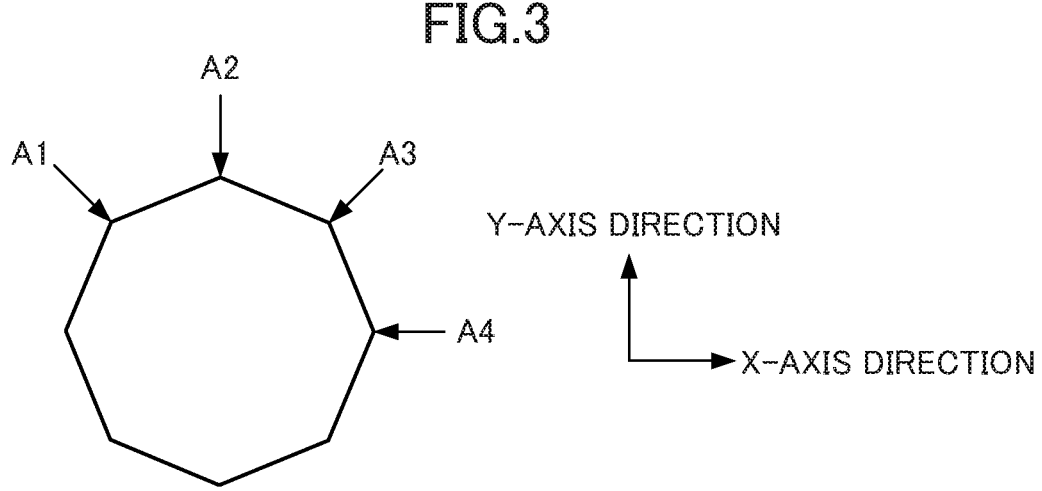
FIG. 3 is a diagram for describing an operation of a servo motor when a machining shape is an octagon.
Figure 4:
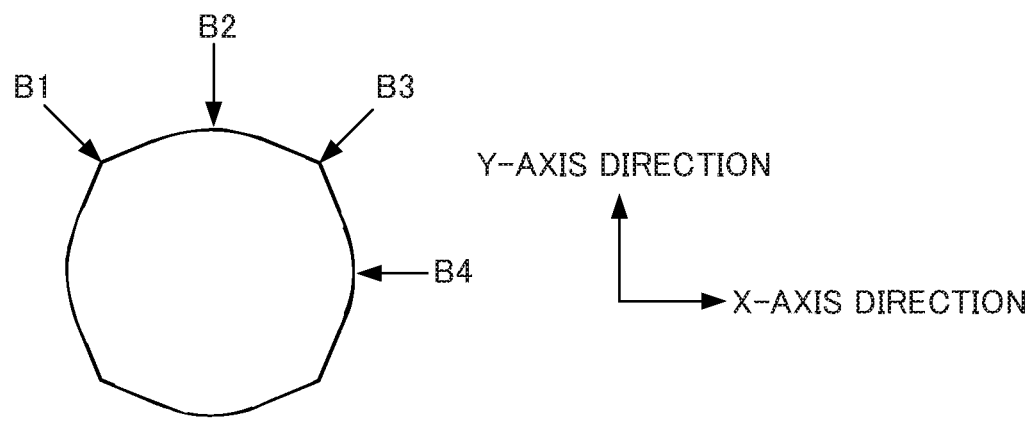
FIG. 4 is a diagram for describing an operation of a motor when a machining shape is a shape in which the corners of an octagon are alternately replaced with arcs.

FIG. 3 is a diagram for describing an operation of a motor when a machining shape is an octagon. FIG. 4 is a diagram for describing an operation of a motor when a machining shape is a shape in which the corners of an octagon are alternately replaced with arcs. In FIGS. 3 and 4, it is assumed that a table is moved in the X and Y-axis directions so that a workpiece (a work) is machined in the clockwise direction.

When the machining shape is an octagon, as illustrated in FIG. 3, the rotation velocity of a motor that moves the table in the Y-axis direction decreases at the corner position A1 whereas the rotation velocity of a motor that moves the table in the X-axis direction increases. A rotation direction of the motor that moves the table in the Y-axis direction is reversed at the corner position A2, and the table moves to be linearly reversed in the Y-axis direction. Moreover, the motor that moves the table in the X-axis direction rotates at an equal velocity in the same rotation direction from the position A1 to the position A2 and from the position A2 to the position A3.

The rotation velocity of the motor that moves the table in the Y-axis direction increases at the corner position A3 whereas the rotation velocity of a motor that moves the table in the X-axis direction decreases. A rotation direction of the motor that moves the table in the X-axis direction is reversed at the corner position A4, and the table moves to be linearly reversed in the X-axis direction. Moreover, the motor that moves the table in the Y-axis direction rotates at an equal velocity in the same rotation direction from the position A3 to the position A4 and from the position A4 to the next corner position.

When the machining shape is a shape in which the corners of an octagon are alternately replaced with arcs, as illustrated in FIG. 4, the rotation velocity of a motor that moves the table in the Y-axis direction decreases at the corner position B1 whereas the rotation velocity of a motor that moves the table in the X-axis direction increases. A rotation direction of the motor that moves the table in the Y-axis direction is reversed at the arc position B2, and the table moves to be linearly reversed in the Y-axis direction. Moreover, the motor that moves the table in the X-axis direction rotates at an equal velocity in the same rotation direction from the position B1 to the position B3. Unlike the case in which the machining shape is an octagon illustrated in FIG. 3, the rotation velocity of the motor that moves the table in the Y-axis direction decreases gradually as it approaches the position B2, the rotation stops at the position B2, and the rotation velocity increases gradually as it departs from the position B2 so that a machining shape of an arc is formed before and after the position B2.

The rotation velocity of the motor that moves the table in the Y-axis direction increases at the corner position B3 whereas the rotation velocity of a motor that moves the table in the X-axis direction decreases. A rotation direction of the motor that moves the table in the X-axis direction is reversed at the arc position B4, and the table moves to be linearly reversed in the X-axis direction. Moreover, the motor that moves the table in the Y-axis direction rotates at an equal velocity in the same rotation direction from the position B3 to the position B4 and from the position B4 to the next corner position. The rotation velocity of the motor that moves the table in the X-axis direction decreases gradually as it approaches the position B4, the rotation stops at the position B4, and the rotation velocity increases gradually as it departs from the position B4 so that a machining shape of an arc is formed before and after the position B4.

In the present embodiment, it is assumed that the machine learning device 200 performs machine learning related to optimization of the coefficients of the transfer function of the IIR filter 1092 of the velocity feedforward calculation unit 109 and the coefficients of the transfer function of the IIR filter 1102 of the position feedforward calculation unit 110 by evaluating vibration when a rotation velocity is changed during linear control at the positions A1 and A3 and the positions B1 and B3 of the machining shape designated by the learning machining program and examining the influence on a position error. The machine learning related to the optimization of the coefficients of the transfer function of the IIR filter is not particularly limited to the velocity feedforward calculation unit and the position feedforward calculation unit but can be also applied to a current feedforward calculation unit having an IIR filter, provided when performing current feedforward of a servo control device, for example.

Hereinafter, the machine learning device 200 will be described in further detail. It is assumed that the machine learning device 200 of the present embodiment performs reinforcement learning related to optimization of the coefficients of the transfer function of the velocity feedforward calculation unit 109 and the position feedforward calculation unit 110 that form a velocity loop and a position loop, respectively, in the servo control device 100 as will be described later as an example of machine learning. Moreover, machine learning in the present invention is not limited to reinforcement learning but the present invention can be also applied to a case of performing another machine learning (for example, supervised learning).

Prior to description of respective functional blocks included in the machine learning device 200, first, a basic mechanism of reinforcement learning will be described. An agent (corresponding to the machine learning device 200 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for reducing a position error, is obtained.

Here, although an arbitrary learning method is used as the reinforcement learning, in the description below, Q-learning which is a method of learning a value Q(S,A) of selecting an action A under a certain environment state S will be described as an example. An object of the Q-learning is to select an action A having the highest value Q(S,A) as an optimal action among actions A that can be taken in a certain state S.

However, at an initial time at which the Q-learning starts, the correct value of the value Q(S,A) is not known at all for a combination of the state S and the action A. Therefore, the agent learns the correct value Q(S,A) by selecting various actions A under a certain state S and making a better selection of action based on rewards given for the selected actions A.

Since the agent wants to maximize the total reward obtained over the course of the future, the Q-learning aims to attain a relation of $Q(S,A)=E[\Sigma(\gamma^t)r_t]$ in the end. Here, E[ ] indicates an expected value, t indicates time, y is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value Q(S,A) can be represented by Expression 3 below (Math. 3).

$$Q(S_{t+1}, A_{t+1}) \leftarrow Q(S_t, A_t) + \alpha\left(r_{t+1} + \gamma \max_A Q(S_{t+1}, A) - Q(S_t, A_t)\right) \quad [\text{Math. 3}]$$

In Expression 3, $S_t$ indicates an environment state at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by γ when an action A having the highest Q value known at that moment was selected under the state $S_{t+1}$. Here, γ is a parameter of 0<γ≤1 and is called a discount rate. Moreover, α is a learning coefficient and is in the range of 0<α1.

Expression 3 indicates a method of updating a value $Q(S_t,A_t)$ of an action $A_t$ in a state $S_t$ on the basis of a returning reward $r_{t+1}$ when the action $A_t$ is performed. This update expression indicates that if the value $\max_a Q(S_{t+1},A)$ of the best action in the next state $S_{t+1}$ associated with an action $A_t$ is larger than the value $Q(S_t,A_t)$ of an action $A_t$ in the state $S_t$, $Q(S_t,A_t)$ is increased, and if otherwise, $Q(S_t,A_t)$ is decreased. That is, the value of a certain action in a certain state approaches the value of the best action in the next state associated with the action. However, although this difference differs depending on the discount rate γ and the reward $r_{t+1}$, the update Expression has such a structure that the value of the best action in a certain state basically propagates to the value of an action in a state previous to that state.

Here, a Q-learning method of creating a value Q(S,A) table for all state-action pairs (S,A) to perform learning is known. However, it may take a considerably long time for the Q-learning to settle when the values of the value Q(S,A) of all state-action pairs are to be calculated since the number of states is too large.

Thus, Q-learning may use an existing technique called a deep Q-network (DQN). Specifically, an agent may calculate the value of the value Q(S,A) by constructing a value function Q using an appropriate neural network and approximating the value function Q with the appropriate neural network by adjusting the parameters of the neural network. By using DQN, it is possible to shorten the time required for settling of Q-learning. The details of DQN are disclosed in Non-Patent Document below, for example.

Non-Patent Document

"Human-level control through deep reinforcement learning", Volodymyr Mnihl [online], [searched on Jan. 17, 2017], Internet <URL: http://files.davidqiu.com/research/nature14236.pdf>

The machine learning device 200 performs the above-described Q-learning. The machine learning device 200 performs machine learning (hereinafter referred to learning) of the transfer function of the IIR filter 1092 of the velocity feedforward calculation unit 109 and the transfer function of the IIR filter 1102 of the position feedforward calculation unit 110 illustrated in FIG. 1.

The machine learning device 200 performs the learning of the coefficients of the transfer function of the IIR filter 1092 on an inner side (the inner loop) than the IIR filter 1102 prior to the learning of the coefficients of the transfer function of the IIR filter 1102. Specifically, the machine learning device 200 fixes the coefficients of the transfer function of the IIR filter 1102 and learns the optimal values of the coefficients of the transfer function of the IIR filter 1092. After that, the machine learning device 200 fixes the coefficients of the transfer function of the IIR filter 1092 to the optimal values obtained by the learning and learns the coefficients of the transfer function of the IIR filter 1102. By performing learning of the coefficients of the transfer function of the IIR filter 1092 prior to the learning of the coefficients of the transfer function of the IIR filter 1102, it is possible to perform learning related to the optimization of the coefficients of the transfer function of the IIR filter 1102 under the condition of the velocity feedforward term (the output of the IIR filter 1092) optimized by the learning.

Although the learning of the coefficients of the transfer function of the IIR filter 1092 and the learning of the coefficients of the transfer function of the IIR filter 1102 may be performed simultaneously, when the learning is performed simultaneously, the amount of information processed for machine learning increases and the settling time of the machine learning increases.

As described above, first, the machine learning device 200 performs machine learning of the coefficients of the transfer function of the IIR filter 1092 of the velocity feedforward calculation unit 109. The machine learning device 200 learns a value Q of selecting an action A of adjusting the coefficients $a_1$, $a_2$, and $b_0$ to $b_2$ of the transfer function VFF(z) of the IIR filter 1092 associated with a state S wherein the state S is a servo state such as commands and feedbacks including the coefficients $a_1$, $a_2$, and $b_0$ to $b_2$ of the transfer function VFF(z) of the IIR filter 1092 of the velocity feedforward calculation unit 109, and the position error information and the position command of the servo control device 100 acquired by executing the learning machining program. Specifically, the machine learning device 200 according to the embodiment of the present invention sets the coefficients of the transfer function VFF(z) of the IIR filter 1092 by searching for, within a predetermined range, a radius r and an angle θ which represent a zero-point and a pole of the transfer function VFF(z) in polar coordinates, respectively, to learn the radius r and the angle θ. The pole is the value of z at which the transfer function VFF(z) is infinity and the zero-point is the value of z at which the transfer function VFF(z) is 0. Due to this, the coefficients in the numerator of the transfer function VFF(z) re modified as follows.

$$b_0+b_1z^{-1}+b_2z^{-2}=b_0(1+(b_1/b_0)z^{-1}+(b_2/b_0)z^{-2})$$

Hereinafter, $(b_1/b_0)$ and $(b_2/b_0)$ will be denoted by $b_1'$ and $b_2'$, respectively, unless particularly stated otherwise. The machine learning device 200 learns the radius r and the angle θ which minimize the position error to set the coefficients $a_1$, $a_2$, $b_1'$, and $b_2'$ of the transfer function VFF(z). The coefficient $b_0$ may be obtained by performing machine learning after the radius r and the angle θ are set to optimal values $r_0$ and $θ_0$, for example. The coefficient $b_0$ may be learned simultaneously with the angle θ. Moreover, the coefficient $b_0$ may be learned simultaneously with the radius r.

After that, the learning of the coefficients $c_1$, $c_2$, and $d_0$ to $d_2$ of the transfer function PFF(z) of the IIR filter 1102 is performed in a method similar to that of the transfer function VFF(z) of the IIR filter 1092. Although the learning of the coefficients of the transfer function VFF(z) of the IIR filter 1092 of the velocity feedforward calculation unit 109 will be described in the following description, the learning of the coefficients of the transfer function PFF(z) of the IIR filter 1102 of the position feedforward calculation unit 110 is performed in a similar manner.

The machine learning device 200 observes the state information S including the servo state such as commands and feedbacks including the position commands and the position error information of the servo control device 100 at the positions A1 and A3 and/or the positions B1 and B3 of the machining shape by executing the learning machining program on the basis of the values of the coefficients $a_1$, $a_2$, and $b_0$ to $b_2$ of the transfer function VFF(z) of the IIR filter 1092 to determine the action A. The machine learning device 200 receives a reward whenever the action A is executed. The machine learning device 200 searches in trial-and-error manner for the optimal action A so that the total of the reward over the course of the future is maximized. By doing so, the machine learning device 200 can select an optimal action A (that is, the values of the optimal zero-point and pole of the transfer function VFF(z) of the IIR filter 1092) with respect to the state S including the servo state such as commands and feedbacks including the position commands and the position error information of the servo control device 100 acquired by executing the learning machining program on the basis of the values of the coefficients calculated on the basis of the values of the zero-point and the pole of the transfer function VFF(z) of the IIR filter 1092. The rotation direction of the servo motor in the X-axis direction and the Y-axis direction does not change at the positions A1 and A3 and the positions B1 and B3, and hence, the machine learning device 200 can learn the values of the zero-point and the pole of the transfer function VFF(z) of the IIR filter 1092 during linear operation.

That is, it is possible to select an action A (that is, the values of the zero-point and the pole of the transfer function VFF(z) of the IIR filter 1092) that minimizes the position error, which is acquired by executing the learning machining program, by selecting an action A that maximizes the value of Q from among the actions A applied to the transfer function VFF(z) of the IIR filter 1092 associated with a certain state S on the basis of the value function Q learned by the machine learning device 200.

Hereinafter, a method of learning the radius r and the angle θ representing the zero-point and the pole of the transfer function VFF(z) of the IIR filter 1092, which minimize the position error, in polar coordinates, to obtain the coefficients $a_1$, $a_2$, $b_1'$, and $b_2'$ of the transfer function VFF(z) and a method of obtaining the coefficient $b_0$ will be described.

The machine learning device 200 sets a pole which is z at which the transfer function VFF(z) in Expression 1 is infinity and a zero-point which is z at which the transfer function VFF(z) is 0, acquired from the IIR filter 1092. The machine learning device 200 multiplies the denominator and the numerator in Expression 1 by $z^2$ to obtain Expression 4 (indicated by Math. 4 below) in order to obtain the pole and the zero-point.

$$VFF(z) = \frac{b_0(z^2 + b_1'z + b_2')}{z^2 + a_1z + a_2}$$ [Math. 4]

The pole is z at which the denominator of Expression 4 is 0 (that is, $z^2+a_1z+a_2=0$), and the zero-point is z at which the numerator of Expression 4 is 0 (that is, $z^2+b_1'z+b_2'=0$).

In the present embodiment, the pole and the zero-point are represented in polar coordinates and searches for the pole and the zero-point represented in polar coordinates. The zero-point is important in suppressing vibration, and the machine learning device 200, first, fixes the pole and sets the coefficients $b_1'$ ($=-re^{i\theta}-re^{-i\theta}$) and $b_2'$ ($=r^2$) calculated when $z=re^{i\theta}$ and the conjugate complex number $z^*=re^{-i\theta}$ in the numerator ($z^2+b_1'z+b_2'$) are the zero-point (the angle θ is in a predetermined range, and 0≤r≤1) as the coefficients of the transfer function VFF(z) to search for the zero-point $re^{i\theta}$ in polar coordinates to learn the values of the optimal coefficients $b_1'$ and $b_2'$. The radius r depends on an attenuation factor, and the angle θ depends on a vibration suppression frequency. After that, the zero-point may be fixed to an optimal value and the value of the coefficient $b_0$ may be learned. Subsequently, the pole of the transfer function VFF(z) is represented in polar coordinates, and the value $re^{i\theta}$ of the pole represented in polar coordinates is searched for by a method similar to the method used for the zero-point. By doing so, it is possible to learn the values of the optimal coefficients $a_1$ and $a_2$ in the denominator of the transfer function VFF(z). When the pole is fixed and the coefficients in the numerator of the transfer function VFF(z), it is sufficient to be able to suppress a high-frequency-side gain, and for example, the pole corresponds to a 2nd-order low-pass filter. For example, a transfer function of a 2nd-order low-pass filter is represented by Expression 5 (indicated as Math. 5 below). ω is a peak gain frequency of the filter.

$$\frac{1}{s^2 + \sqrt{2}\,\omega s + \omega^2}$$ [Math. 5]

When the pole is a 3rd-order low-pass filter, the 3rd-order low-pass filter can be formed by providing three 1st-order low-pass filters of which the transfer function is represented by 1/(1+Ts) (T is a time constant of the filter) and may be formed by combining the 1st-order low-pass filter with the 2nd-order low-pass filter in Expression 5. The transfer function in the z-domain is obtained using bilinear transformation of the transfer function in the s-domain.

Although the pole and the zero-point of the transfer function VFF(z) can be searched simultaneously, it is possible to reduce the amount of machine learning and shorten the learning time when the pole and the zero-point are searched and learned separately.

Figure 5:
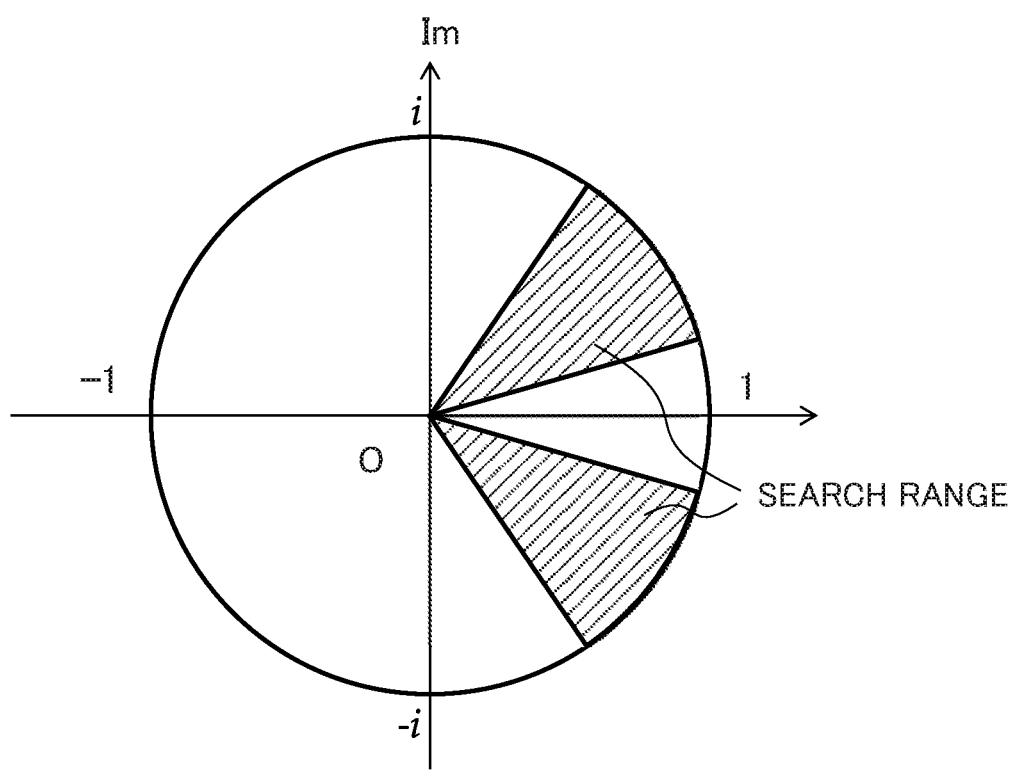
FIG. 5 is an explanatory diagram of a complex plane illustrating a search range of a pole and a zero-point.

The search ranges of the pole and the zero-point can be narrowed down to predetermined search ranges indicated by hatched regions by defining the radius r in the range of 0≤r≤1, for example, in a complex plane in FIG. 5 and defining the angle θ in a responsible frequency range of a velocity loop. The upper limit of the frequency range can be set to 200 Hz since the vibration generated due to resonance of the velocity loop is approximately 200 Hz, for example. Although the search range is determined by resonance characteristics of a control target such as a machine tool, since the angle θ corresponds to 90° at approximately 250 Hz when the sampling period is 1 msec, if the upper limit of the frequency range is 200 Hz, a search range of the angle θ is obtained as in the complex plane of FIG. 5. By narrowing down the search range to a predetermined range in this manner, it is possible to reduce the amount of machine learning and shorten the settling time of machine learning.

When the zero-point is searched for in polar coordinates, first, the coefficient $b_0$ is fixed to 1, for example, and the radius r is fixed to an arbitrary value within the range of 0≤r≤1, and the angle θ in the search range illustrated in FIG. 5 is set in a trial-and-error manner to thereby set the coefficients $b_1'$ ($=-re^{j\theta}-re^{-j\theta}$) and $b_2'$ ($=r^2$) such that z and the conjugate complex number z* are the zero-point of ($z^2+b_1'z+b_2'$). The initial setting value of the angle θ is set in the search range illustrated in FIG. 5. The machine learning device 200 transmits the adjustment information of the obtained coefficients $b_1'$ and $b_2'$ to the IIR filter 1092 as the action A and sets the coefficients $b_1'$ and $b_2'$ in the numerator of the transfer function VFF(z) of the IIR filter 1092. The coefficient $b_0$ is set to 1, for example, as described above. When such an ideal angle $\theta_0$ that maximizes the value of the value function Q by the machine learning device 200 performing learning to search for the angle θ is determined, the angle θ is fixed to the angle $\theta_0$ and the radius r is varied to thereby set the coefficients $b_1'$ ($=-re^{j\theta}-re^{-j\theta}$e) and $b_2'$ ($=r^2$) in the numerator of the transfer function VFF(z) of the IIR filter 1092. By the learning of searching for the radius r, such an optimal radius $r_0$ that maximizes the value of the value function Q is determined. The coefficients $b_1'$ and $b_2'$ are set with the aid of the angle $\theta_0$ and the radius $r_0$, and after that, learning is performed with respect to $b_0$, whereby the coefficients $b_0$, $b_1'$, and $b_2'$ in the numerator of the transfer function VFF(z) are determined.

When the pole is searched for in polar coordinates, learning can be performed similarly to the denominator of the transfer function VFF(z). First, the radius r is fixed to a value in the range of (for example, 0≤r≤1), and the angle θ is searched for in the search range similarly to the searching of the zero-point to determine an ideal angle θ of the pole of the transfer function VFF(z) of the IIR filter 1092 by learning. After that, the angle θ is fixed to the angle and the radius r is searched for and learned whereby the ideal angle θ and the ideal radius r of the pole of the transfer function VFF(z) of the IIR filter 1092 are determined. By doing so, the optimal coefficients $a_1$ and $a_2$ corresponding to the ideal angle θ and the ideal radius r of the pole are determined. As described above, the radius r depends on the attenuation factor, and the angle θ depends on a vibration suppression frequency. Therefore, it is preferable to learn the angle θ prior to the radius r in order to suppress vibration.

In this manner, by searching for, within a predetermined range, the radius r and the angle θ which represent the zero-point and the pole of the transfer function VFF(z) of the IIR filter 1092 in polar coordinates, respectively, so that the position error is minimized, it is possible to perform optimization of the coefficients $a_1$, $a_2$, $b_0$, $b_1'$, and $b_2'$ of the transfer function VFF(z) more efficiently than learning the coefficients $a_1$, $a_2$, $b_0$, $b_1'$, and $b_2'$ directly.

When the coefficient $b_0$ of the transfer function VFF(z) of the IIR filter 1092 is learned, the initial value of the coefficient $b_0$ is set to 1, for example, and after that, the coefficient $b_0$ of the transfer function VFF(z) included in the action A is increased or decreased incrementally. The initial value of the coefficient $b_0$ is not limited to 1. The initial value of the coefficient $b_0$ may be set to an arbitrary value. The machine learning device 200 returns a reward on the basis of a position error whenever the action A is executed and adjusts the coefficient $b_0$ of the transfer function VFF(z) to an ideal value that maximizes the value of the value function Q by reinforcement learning of searching for the optimal action A in a trial-and-error manner so that a total future reward is maximized. Although the learning of the coefficient $b_0$ is performed subsequently to the learning of the radius r in this example, the coefficient $b_0$ may be learned simultaneously with the angle θ and may be learned simultaneously with the radius r. Although the radius r, the angle θ, and the coefficient $b_0$ can be learned simultaneously, it is possible to reduce the amount of machine learning and shorten the settling time of machine learning when these coefficients are learned separately.

When the learning associated with the optimization of the coefficients of the transfer function VFF(z) of the IIR filter 1092 ends, the learning associated with the optimization of the coefficients of the transfer function PFF(z) of the IIR filter 1102 is performed subsequently. The machine learning device 200 multiplies the denominator and the numerator in Expression 2 by $z^2$ to obtain Expression 6 (indicated by Math. 6 below) in order to obtain the pole and the zero-point.

$$PFF(z) = \frac{d_0(z^2 + d_1'z + d_2')}{z^2 + c_1z + c_2} \qquad \text{[Math. 6]}$$

$d_1'$ and $d_2'$ in Expression 6 correspond to $(d_1/d_0)$ and $(d_2/d_0)$, respectively. Subsequently, the radius r and the angle θ which represent the zero-point and the pole of the transfer function PFF(z) of the IIR filter 1102 in polar coordinates are learned to perform optimization of the coefficients $c_1$, $c_2$, and $d_0$ to $d_2$ of the transfer function PFF(z) similarly to the case of learning of the radius r and the angle θ which represent the zero-point and the pole of the transfer function VFF(z) of the IIR filter 1092. Therefore, the description thereof will be omitted.

Figure 6:
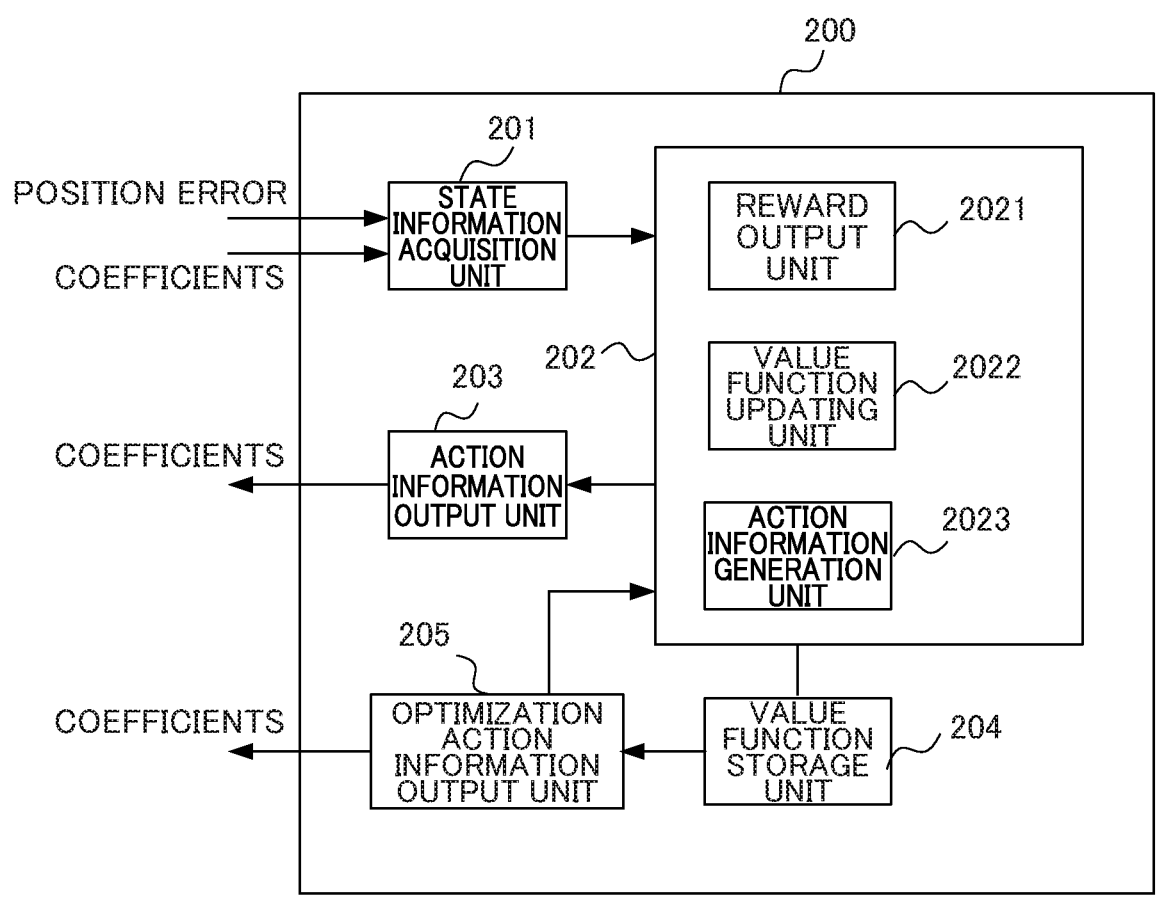
FIG. 6 is a block diagram illustrating a machine learning device according to the present embodiment.

FIG. 6 is a block diagram illustrating the machine learning device 200 of the present embodiment. While the learning of the coefficients of the transfer function VFF(z) of the IIR filter 1092 of the velocity feedforward calculation unit 109 will be described later, the learning of the coefficients of the transfer function of the IIR filter 1102 of the position feedforward calculation unit 110 is performed similarly. As illustrated in FIG. 6, in order to perform the reinforcement learning described above, the machine learning device 200 includes a state information acquisition unit 201, a learning unit 202, an action information output unit 203, a value function storage unit 204, and an optimization action information output unit 205. The learning unit 202 includes a reward output unit 2021, a value function updating unit 2022, and an action information generation unit 2023.

The state information acquisition unit 201 acquires, from the servo control device 100, the state S including a servo state such as commands and feedbacks including the position commands and the position error information of the servo control device 100 acquired by executing the learning machining program on the basis of the values of the coefficients $a_1$, $a_2$, and $b_0$ to $b_2$ of the transfer function VFF(z) of the IIR filter 1092 of the velocity feedforward calculation unit 109 of the servo control device 100. The state information S corresponds to a state S of the environment in the Q-learning. The state information acquisition unit 201 outputs the acquired state information S to the learning unit 202. Moreover, the state information acquisition unit 201 acquires the angle θ and the radius r which represent the zero-point and the pole in polar coordinates and the corresponding coefficients $a_1$, $a_2$, $b_1'$, and $b_2'$ from the action information generation unit 2023 to store the same therein and outputs the angle θ and the radius r which represent the zero-point and the pole corresponding to the coefficients $a_1$, $a_2$, $b_1'$, and $b_2'$ acquired from the servo control device 100 in polar coordinates to the learning unit 202.

The initial setting values of the transfer function VFF(z) of the IIR filter 1092 at a time point at which the Q-learning starts initially are set by a user in advance. In the present embodiment, after that, the initial setting values of the coefficients $a_1$, $a_2$, and $b_0$ to $b_2$ of the transfer function VFF(z) of the IIR filter 1092 set by the user are adjusted to optimal values by reinforcement learning of searching for the radius r and the angle θ which represent the zero-point and the pole in polar coordinates as described above. The coefficient α of the double differentiator 1091 of the velocity feedforward calculation unit 109 is set to a fixed value such as α=1, for example. Moreover, the initial setting values in the denominator of the transfer function VFF(z) of the IIR filter 1092 are set to those illustrated in Math. 5 (the transfer function in the z-domain converted by bilinear transformation). Moreover, as for the initial setting values of the coefficients $b_0$ to $b_2$ in the numerator of the transfer function VFF(z), $b_0$=1, the radius r can be set to a value within the range of 0≤r≤1, and the angle θ can be set to a value within the predetermined search range. The initial setting values of the position feedforward calculation unit 110 are set in a similar manner. Furthermore, as for the coefficients $a_1$, $a_2$, and $b_0$ to $b_2$ and the coefficients $c_1$, $c_2$, and $d_0$ to $d_2$, when an operator adjusts the machine tool in advance, machine learning may be performed using the values of the radius r and the angle θ which represent the zero-point and the pole of the adjusted transfer function in polar coordinates as initial values.

The learning unit 202 is a unit that learns the value Q(S,A) when a certain action A is selected under a certain state S of the environment. Here, the action A fixes the coefficient $b_0$ to 1, for example, and calculates the correction information of the coefficients $b_1'$ and $b_2'$ in the numerator of the transfer function VFF(z) of the IIR filter 1092 on the basis of the correction information of the radius r and the angle θ which represent the zero-point of the transfer function VFF(z) in polar coordinates. In the following description, a case in which the coefficient $b_0$ is initially set as 1, for example, and the action information A is the correction information of the coefficients $b_1'$ and $b_2'$ will be described as an example.

The reward output unit 2021 is a unit that calculates a reward when the action A is selected under a certain state S. Here, a set (a position error set) of position errors which are state variables of the state S will be denoted by PD(S), and a position error set which is state variables related to state information S' which is changed from the state S due to the action information A will be denoted by PD(S'). Moreover, the position error value in the state S is a value calculated based on a predetermined evaluation function f(PD(S)). Functions can be used as the evaluation function f includes: A function that calculates an integrated value of an absolute value of a position error $$\int |e| dt$$

A function that calculates an integrated value by a weighting an absolute value of a position error with time $$\int t|e| dt$$

A function that calculates an integrated value of a 2n-th power (n is a natural number) of an absolute value of a position error $\int e^{2n} dt$ (n is a natural number)
A function that calculates a maximum value of an absolute value of a position error $$\text{Max}\{|e|\}$$

In this case, the reward output unit 2021 sets the value of a reward to a negative value when the position error value f(PD(S')) of the servo control device 100 operated based on the velocity feedforward processing unit 109 after the correction related to the state information S' corrected by the action information A is larger than the position error value f(PD(S)) of the servo control device 100 operated based on the velocity feedforward processing unit 109 before correction related to the state information S before being corrected by the action information A.

On the other hand, the reward output unit 2021 sets the value of the reward to a positive value when the position error value f(PD(S')) of the servo control device 100 operated based on the velocity feedforward processing unit 109 after the correction related to the state information S' corrected by the action information A is smaller than the position error value f(PD(S)) of the servo control device 100 operated based on the velocity feedforward processing unit 109 before correction related to the state information S before being corrected by the action information A. Moreover, the reward output unit 2021 may set the value of the reward to zero when the position error value f(PD(S')) of the servo control device 100 operated based on the velocity feedforward processing unit 109 after the correction related to the state information S' corrected by the action information A is equal to the position error value f(PD(S)) of the servo control device 100 operated based on the velocity feedforward processing unit 109 before correction related to the state information S before being corrected by the action information A.

Furthermore, if the position error value f(PD(S')) in the state S' after execution of the action A becomes larger than the position error value f(PD(S)) in the previous state S, the negative value may be increased according to the proportion. That is, the negative value may be increased according to the degree of increase in the position error value. In contrast, if the position error value f(PD(S')) in the state S' after execution of the action A becomes smaller than the position error value f(PD(S)) in the previous state S, the positive value may be increased according to the proportion. That is, the positive value may be increased according to the degree of decrease in the position error value.

The value function updating unit 2022 updates the value function Q stored in the value function storage unit 204 by performing Q-learning based on the state S, the action A, the state S' when the action A was applied to the state S, and the value of the reward calculated in the above-mentioned manner. The updating of the value function Q may be performed by online learning, batch learning, or mini-batch learning. Online learning is a learning method of applying a certain action A to a present state S and updating the value function Q immediately whenever the present state S transitions to a new state S'. Batch learning is a learning method where, by applying a certain action A to a present state S and by repeating the state S transitioning to a new state S', collecting learning data, the value function Q is updated using all the collected learning data. Mini-batch learning is a learning method which is an intermediate between online learning and batch learning and involves updating the value function Q whenever a certain amount of learning data is collected.

The action information generation unit 2023 selects the action A in the process of Q-learning with respect to the present state S. The action information generation unit 2023 generates action information A and outputs the generated action information A to the action information output unit 203 in order to perform an operation (corresponding to the action A of Q-learning) of correcting the coefficients $b_1'$ and $b_2'$ of the transfer function VFF(z) of the IIR filter 1092 of the servo control device 100 in the process of Q-learning on the basis of the radius r and the angle θ which represent the zero-point in polar coordinates. More specifically, the action information generation unit 2023 increases or decreases the angle θ received from the state information acquisition unit 201 within the search range illustrated in FIG. 5 in a state in which the coefficients $a_1$, $a_2$, and $b_0$ of the transfer function VFF(z) in Expression 4 are fixed and the radius r received from the state information acquisition unit 201 while setting the zero-point of z in the numerator $(z^2+b_1'z+b_2')$ as $re^{j\theta}$ in order to search for the zero-point in polar coordinates, for example. Moreover, z serving as the zero-point and the conjugate complex number thereof z* are set with the aid of the fixed radius z and the increased or decreased angle θ, and new coefficients $b_1'$ and $b_2'$ are calculated on the basis of the zero-point.

When the state S transitions to the state S' by increasing or decreasing the angle θ and newly setting the coefficients $b_1'$ and $b_2'$ of the transfer function VFF(z) of the IIR filter 1092, and a plus reward (a positive reward) is offered in return, the action information generation unit 2023 may select a policy where an action A' that leads to the value of the position error becoming further decreased, such as by increasing or decreasing the angle θ similarly to the previous action, is selected as the next action A'.

In contrast, when a minus reward (a negative reward) is offered in return, the action information generation unit 2023 may select a policy where an action A' that leads to the value of the position error becoming smaller than the previous value, such as by decreasing or increasing the angle θ contrarily to the previous action, is selected as the next action A'.

The action information generation unit 2023 may select a policy where the action A' is selected according to a known method such as a greedy method where an action A' having the highest value Q(S,A) among the values of presently estimated actions A is selected or an ε-greedy method where an action A' with a certain small probability is randomly selected and an action A' having the highest value Q(S,A) is selected in other cases.

When searching of the angle θ is continued and an ideal angle $θ_0$ that maximizes the value of the value Q is determined by learning with the aid of optimization action information (to be described later) from the optimization action information output unit 205, the action information generation unit 2023 fixes the angle θ to the angle $θ_0$ to search for the radius r within the range of 0≤r≤1 and sets the coefficients $b_1'$ and $b_2'$ in the numerator of the transfer function VFF(z) of the IIR filter 1092 similarly to the searching of the angle θ. When searching of the radius r is continued and an ideal radius $r_0$ that maximizes the value of the value Q is determined by learning with the aid of the optimization action information (to be described later) from the optimization action information output unit 205, the action information generation unit 2023 determines the optimal coefficients $b_1'$ and $b_2'$ in the numerator. After that, as described above, the optimal values of the coefficients in the numerator of the transfer function VFF(z) are learned by learning the coefficient $b_0$.

After that, the action information generation unit 2023 searches for the coefficients of the transfer function related to the numerator of the transfer function VFF(z) on the basis of the radius r and the angle θ which represent the pole in polar coordinates as described above. The learning adjusts the radius r and the angle θ which represent the pole in polar coordinates by reinforcement learning similarly to the case in the numerator of the transfer function VFF(z) of the IIR filter 1092. In this case, the radius r is learned after learning the angle θ similarly to the case in the numerator of the transfer function VFF(z). Since a learning method is similar to the case of searching of the zero-point of the transfer function VFF(z), the detailed description thereof will be omitted.

The action information output unit 203 is a unit that transmits the action information A output from the learning unit 202 to the servo control device 100. As described above, the servo control device 100 finely corrects the present state S (that is, the presently set radius r and angle θ which represent the zero-point of the transfer function VFF(z) of the IIR filter 1092 in polar coordinates) on the basis of the action information to thereby transition to the next state S' (that is, the coefficients $b_1'$ and $b_2'$ of the transfer function VFF(z) of the IIR filter 1092 corresponding to the corrected zero-point).

The value function storage unit 204 is a storage device that stores the value function Q. The value function Q may be stored as a table (hereinafter referred to as an action value table) for each state S and each action A, for example. The value function Q stored in the value function storage unit 204 is updated by the value function updating unit 2022. Moreover, the value function Q stored in the value function storage unit 204 may be shared with other machine learning devices 200. When the value function Q is shared by a plurality of machine learning devices 200, since reinforcement learning can be performed in distributed manner in the respective machine learning devices 200, it is possible to improve the reinforcement learning efficiency.

The optimization action information output unit 205 generates the action information A (hereinafter referred to as "optimization action information") which causes the velocity feedforward calculation unit 109 to perform an operation of maximizing the value Q(S,A) based on the value function Q updated by the value function updating unit 2022 performing the Q-learning. More specifically, the optimization action information output unit 205 acquires the value function Q stored in the value function storage unit 204. As described above, the value function Q is updated by the value function updating unit 2022 performing the Q-learning. The optimization action information output unit 205 generates the action information on the basis of the value function Q and outputs the generated action information to the servo control device 100 (the IIR filter 1092 of the velocity feedforward calculation unit 109). The optimization action information includes information that corrects the coefficients of the transfer function VFF(z) of the IIR filter 1092 by learning the angle θ, the radius r, and the coefficient $b_0$ similarly to the action information that the action information output unit 203 outputs in the process of Q-learning.

In the servo control device 100, the coefficients of the transfer function related to the numerator of the transfer function VFF(z) of the IIR filter 1092 are corrected on the basis of the action information which is based on the angle θ, the radius r, and the coefficient $b_0$. After optimization of the coefficients in the numerator of the transfer function VFF(z) of the IIR filter 1092 is performed with the above-described operations, the machine learning device 200 performs optimization of the coefficients in the denominator of the transfer function VFF(z) of the IIR filter 1092 by learning the angle θ and the radius r similarly to the optimization. After that, similarly to the learning and the optimization of the coefficients of the transfer function VFF(z) of the IIR filter 1092, the machine learning device 200 can perform learning and optimization of the coefficients of the transfer function PFF(z) of the IIR filter 1102 by learning the angle θ, the radius r, and the coefficient $d_0$ and operate so as to reduce the position error value. As described above, by using the machine learning device 200 according to the present invention, it is possible to simplify the adjustment of the parameters of the velocity feedforward calculation unit 109 and the position feedforward calculation unit 110 of the servo control device 100.

Hereinabove, the functional blocks included in the servo control device 100 and the machine learning device 200 have been described. In order to realize these functional blocks, the servo control device 100 and the machine learning device 200 each include an arithmetic processing unit such as a central processing unit (CPU). The servo control device 100 and the machine learning device 200 each further include an auxiliary storage device such as a hard disk drive (HDD) storing various control programs such as application software or an operating system (OS) and a main storage device such as a random access memory (RAM) for storing data temporarily required when the arithmetic processing device executes a program.

In each of the servo control device 100 and the machine learning device 200, the arithmetic processing device reads an application or an OS from the auxiliary storage device, and deploys the read application software and OS in the main storage device to perform arithmetic processing based on the read application software or OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 200 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high velocity processing can be performed. Furthermore, in order to perform faster processing, the machine learning device 200 may construct a computer cluster using a plurality of computers equipped with such GPUs and may perform parallel processing with the plurality of computers included in the computer cluster.

Figure 7:
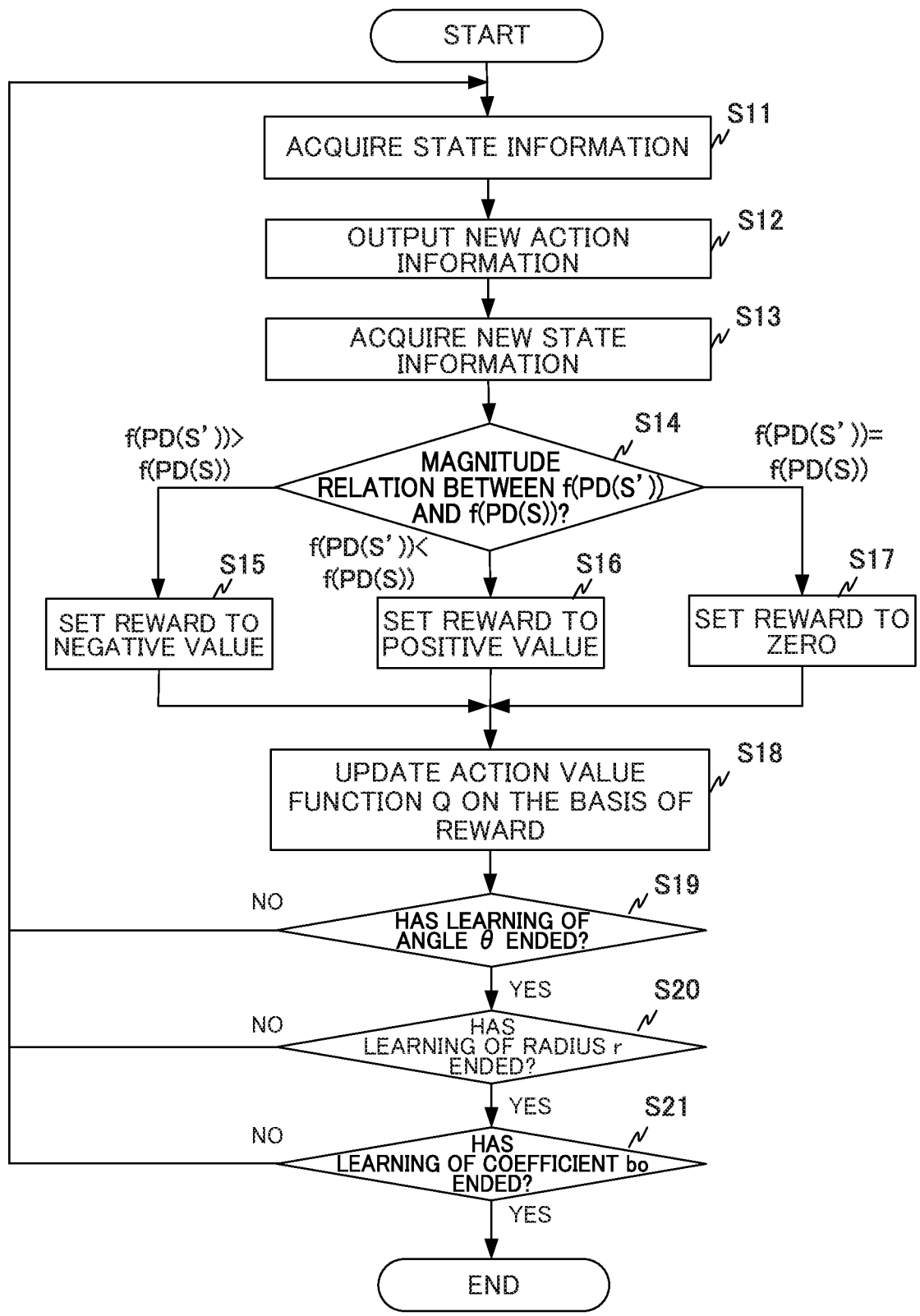
FIG. 7 is a flowchart illustrating an operation of the machine learning device according to the present embodiment.

Next, an operation of the machine learning device 200 during Q-learning according to the present embodiment will be described with reference to the flowcharts of FIG. 7. The flowchart of FIG. 7 is a flowchart related to learning of the angle θ, the radius r, and the coefficient $b_0$ for determining the coefficients $b_0$ to $b_2$ related to the transfer function in the numerator of the transfer function VFF(z) of the IIR filter 1092 of the velocity feedforward calculation unit 109. Although the following flowchart describes learning of the angle θ, the radius r, and the coefficient $b_0$ which represent the zero-point of the transfer function VFF(z) for determining the coefficients $b_0$ to $b_2$ related to the transfer function in the numerator of the transfer function VFF(z) of the IIR filter 1092 of the velocity feedforward calculation unit 109 in polar coordinates as an example, the learning of the angle θ and the radius r which represent the pole for determining the coefficients $a_1$ and $a_2$ related to the transfer function in the denominator in polar coordinates can be performed according to a similar flowchart. Moreover, since the flowchart of the learning of the angle θ, the radius r, and the coefficient $d_0$ which represent the zero-point and the pole of the transfer function PFF(z) for determining the coefficients $c_1$, $c_2$, and $d_0$ to $d_2$ of the transfer function PFF(z) of the IIR filter 1102 of the position feedforward calculation unit 110 performed subsequently in polar coordinates is similar to the flowchart illustrated in FIG. 7, the description thereof will be omitted.

In step S11, the state information acquisition unit 201 acquires the state information S from the servo control device 100. The acquired state information S is output to the value function updating unit 2022 and the action information generation unit 2023. As described above, the state information S is information corresponding to the state of Q-learning and includes the coefficients $a_1$, $a_2$, and $b_0$ to $b_2$ of the transfer function VFF(z) of the IIR filter 1091 at the time point of step S11. The state information $S_0$ at an initial time at which the learning starts is an initial setting value, and the coefficient $b_0$ related to the numerator of the transfer function VFF(z) of the IIR filter 1092 and the coefficients $a_1$ and $a_2$ related to the denominator are set to fixed values. In this way, a position error set PD(S) corresponding to a predetermined feed rate and a machining shape of a circle when the coefficients $a_1$, $a_2$, and $b_0$ to $b_2$ of the transfer function VFF(z) of the IIR filter 1092 are set to initial values are acquired.

The position error value $PD(S_0)$ in the state $S_0$ is obtained from the subtractor 102 at a time point at which Q-learning starts initially by operating the servo control device 100 according to a learning machining program. The position command creation unit 101 outputs position commands sequentially according to a predetermined machining shape (for example, a machining shape of an octagon) designated by the machining program. For example, a position command value corresponding to the machining shape of an octagon is output from the position command creation unit 101, and the position command value is output to the subtractor 102, the velocity feedforward calculation unit 109, the position feedforward calculation unit 110, and the machine learning device 200. The subtractor 102 outputs a difference between the position command value and the detection position output from the integrator 108 at the positions A1 and A3 and the positions B1 and B3 of the machining shape to the machine learning device 200 as the position error $PD(S_0)$. In the machine learning device 200, the difference between the position command value and the detection position output from the integrator 108 at the positions A1 and A3 and the positions B1 and B3 of the machining shape may be extracted as the position error $PD(S_0)$.

In step S12, the action information generation unit 2023 generates new action information A in the order of the angle θ, the radius r, and the coefficient $b_0$ on the basis of the radius r and the angle θ which represent the zero-point in polar coordinates as described above and outputs the generated new action information A to the servo control device 100 via the action information output unit 203. The action information generation unit 2023 outputs the new action information A on the basis of the above-described policy. The servo control device 100 having received the action information A drives a machine tool including the servo motor 300 according to the state S' obtained by correcting the coefficients $b_1'$ and $b_2'$ of the transfer function VFF(z) of the IIR filter 1092 associated with the present state S on the basis of the received action information. As described above, the action information corresponds to the action A in Q-learning.

In step S13, the state information acquisition unit 201 acquires the position error PD(S') in the new state S' and the coefficients $b_1'$ and $b_2'$ of the transfer function VFF(z) of the IIR filter 1092 from the subtractor 102. In this way, the state information acquisition unit 201 acquires the position error set PD(S') corresponding to the machining shape of an octagon (specifically, the positions A1 and A3 and the positions B1 and B3 of the machining shape) corresponding to the coefficients of the transfer function VFF(z) in the state S'. The acquired state information is output to the reward output unit 2021.

In step S14, the reward output unit 2021 determines a magnitude relation between the position error value f(PD(S')) in the state S' and the position error value f(PD(S)) in the state S and sets the reward to a negative value in step S15 when f(PD(S'))>f(PD(S)). When f(PD(S'))<f(PD(S)), the reward output unit 2021 sets the reward to a positive value in step S16. When f(PD(S'))=f(PD(S)), the reward output unit 2021 sets the reward to zero in step S17. The reward output unit 2021 may apply a weighting to the negative and positive reward values.

When any one of steps S15, S16, and S17 ends, the value function updating unit 2022 updates the value function Q stored in the value function storage unit 204 on the basis of the value of the reward calculated in any one of the steps in step S18. Although online updating is exemplified in step S18, batch updating or mini-batch updating may be performed instead of the online updating. Subsequently, the flow returns to step S11 when it is determined in step S19 that the learning of the angle θ has not ended and the flow proceeds to step S20 when the learning has ended. Subsequently, the flow returns to step S11 when it is determined in step S20 that the learning of the radius r has not ended and the flow proceeds to step S21 when the learning has ended. Subsequently, the flow returns to step S11 when it is determined in step S21 that the learning of the coefficient $b_0$ has not ended and the flow ends when the learning has ended. After that, the flow returns to step S11 again, and the above-described processes of steps S11 to S21 are repeated, whereby the value function Q settles to an appropriate value. The learning of the angle θ, the radius r, and the coefficient may end on condition that the above-described processes are repeated for a predetermined number of times or a predetermined period.

Due to the operation described with reference to FIG. 7 and the like, the machine learning device 200 described as an example in the present embodiment provides advantages that it is possible to further shorten the learning time required for the optimization of the coefficients of the transfer functions of the IIR filters 1092 and 1102 by searching for and learning, within a predetermined range, the values of the radius r and the angle θ which represent the zero-point and the pole of the transfer functions of the IIR filters 1092 and 1102 in polar coordinates. Next, an operation during generation of the optimization action information by the optimization action information output unit 205 will be described with reference to the flowchart of FIG. 8. First, in step S31, the optimization action information output unit 205 acquires the value function Q stored in the value function storage unit 204. As described above, the value function Q is updated by the value function updating unit 2022 performing the Q-learning.

In step S32, the optimization action information output unit 205 generates the optimization action information on the basis of the value function Q and outputs the generated optimization action information to the IIR filter 1092 of the servo control device 100. With the above-described operations, the machine learning device 200 optimizes the angle θ, the radius r, and the coefficient $b_0$ which represent the zero-point for determining the coefficients in the numerator of the transfer function VFF(z) of the IIR filter 1092 in polar coordinates, and then optimizes the angle θ and the radius r which represent the pole for determining the coefficients $a_1$ and $a_2$ related to the transfer function in the denominator in polar coordinates. With similar operations, the machine learning device 200 performs learning related to the angle θ and the radius r which represent the zero-point and the pole of the transfer function PFF(z) in polar coordinates and performs learning and optimization related to the coefficient $d_0$ in order to determine the coefficients $c_1$, $c_2$, and $d_0$ to $d_2$ of the transfer function PFF(z) of the IIR filter 1102.

Figure 8:
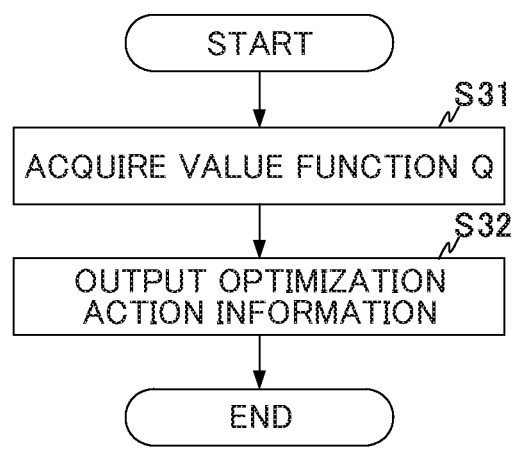
FIG. 8 is a flowchart illustrating an operation of an optimization action information output unit of the machine learning device according to the present embodiment.

In the present embodiment, due to the operations described with reference to FIG. 8, the machine learning device 200 can generate the optimization action information on the basis of the value function Q obtained by learning, and the servo control device 100 can simplify the adjustment of the presently set coefficients $a_1$, $a_2$, and $b_0$ to $b_2$ of the transfer function VFF(z) of the IIR filter 1092 and reduce the position error value on the basis of the optimization action information. Moreover, when the coefficients of the velocity feedforward are set to the initial values for higher dimensions and the machine learning device 200 performs learning, the position error value can be reduced further. As for the adjustment of the coefficients $c_1$, $c_2$, and $d_0$ to $d_2$ of the transfer function PFF(z) of the IIR filter 1102, the position error value can be reduced similarly to the adjustment of the coefficients $a_1$, $a_2$, and $b_0$ to $b_2$ of the transfer function VFF(z) of the IIR filter 1092.

In the present embodiment, the reward output unit 2021 calculated the reward value by comparing the evaluation function value f(PD(S)) of the position error in the state S calculated on the basis of the predetermined evaluation function f(PD(S)) using the position error PD(S) in the state S as an input with the evaluation function value f(PD(S')) of the position error in the state S' calculated on the basis of the evaluation function f(PD(S')) using the position error PD(S') in the state S' as an input. However, the reward output unit 2021 may add another element other than the position error when calculating the reward value. For example, the machine learning device 200 may add at least one of a position-feedforward-controlled velocity command output from the adder 104, a difference between a velocity feedback and a position-feedforward-controlled velocity command, and a position-feedforward-controlled torque command output from the adder 107 in addition to the position error output from the subtractor 102.

Moreover, either the position feedforward calculation unit or the velocity feedforward calculation unit may be provided as the feedforward calculation unit. In this case, when the position feedforward calculation unit only is provided, for example, the double differentiator 1091, the IIR filter 1092, and the adder 107 are not necessary. The servo control unit of the servo control device described above and the components included in the machine learning device may be realized by hardware, software or a combination thereof. The servo control method performed by cooperation of the components included in the servo control device described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). Moreover, the programs may be supplied to a computer via various types of transitory computer readable media.

The above-described embodiment is a preferred embodiment of the present invention. However, the scope of the present invention is not limited to the embodiment only but the present invention can be embodied in various modifications without departing from the spirit of the present invention.

<Modification in which Servo Control Device Includes Machine Learning Device>

Although the machine learning device 200 is configured as a device separate from the servo control device 100 in the above-described embodiments, some or all of the functions of the machine learning device 200 may be realized by the servo control device 100.

<Freedom in System Configuration>

Figure 9:
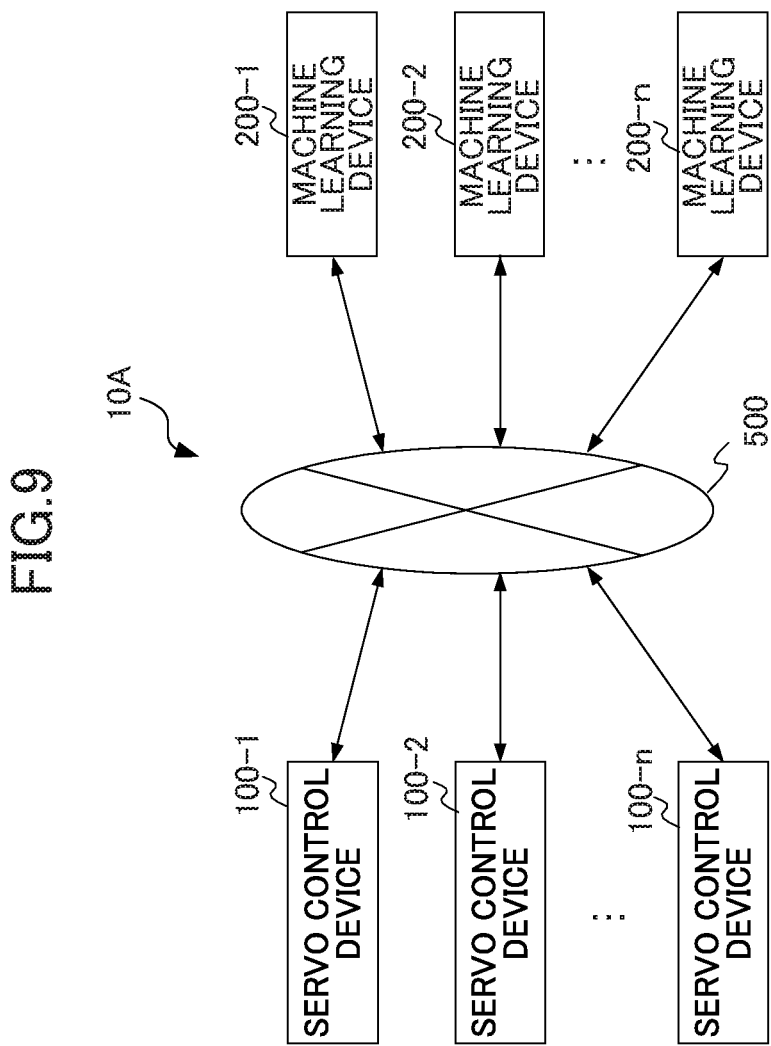
FIG. 9 is a block diagram illustrating a control device according to another embodiment.

FIG. 9 is a block diagram illustrating a control device according to another embodiment of the present invention. As illustrated in FIG. 9, a control device 10A includes n servo control devices 100-1 to 100-$n$ (n is a natural number of 2 or more), n machine learning devices 200-1 to 200-$n$, and a network 500. n is a freely selected natural number. Each of the n servo control devices 100-1 to 100-$n$ corresponds to the servo control device 100 illustrated in FIG. 1. Each of the n machine learning devices 200-1 to 200-$n$ corresponds to the machine learning device 200 illustrated in FIG. 1.

Here, the servo control device 100-1 and the machine learning device 200-1 are paired in a one-to-one relationship and are communicably connected. The servo control device 100-2 to 100-$n$ and the machine learning devices 200-2 to 200-$n$ are connected in a similar manner to the servo control device 100-1 and the machine learning device 200-1. Although the n pairs of the servo control devices 100-1 to 100-$n$ and the machine learning device 200-1 to 200-$n$ are connected via the network 500 in FIG. 9, the n pairs of the servo control devices 100-1 to 100-n and the machine learning devices 200-1 to 200-n may be connected directly via connection interfaces, respectively. A plurality of n pairs of the servo control devices 100-1 to 100-n and the machine learning devices 200-1 to 200-n may be, for example, provided in the same plant or may be provided in different plants, respectively.

The network 500 is, for example, a local area network (LAN) constructed in a plant, the Internet, a public telephone network, or a combination thereof. The specific communication scheme of the network 500, as well as whether the network uses a cable connection or a wireless connection, and the like are not particularly limited.

In the control device illustrated in FIG. 9, although the machine learning devices 200-1 to 200-n and the servo control devices 100-1 to 100-n are communicably connected as a one-to-one correspondence, one machine learning device 200-1 may be communicably connected to a plurality of servo control devices 100-1 to 100-m (m<n or m=n) via the network 500, and may perform machine learning of the servo control devices 100-1 to 100-m. In this case, a distributed processing system may be adopted, in which the respective functions of the machine learning device 200-1 are distributed to a plurality of servers as appropriate. The functions of the machine learning device 200-1 may be realized by utilizing a virtual server function, or the like, in a cloud. When there is a plurality of machine learning devices 200-1 to 200-n respectively corresponding to a plurality of servo control devices 100-1 to 100-n of the same type name, the same specification, or the same series, the machine learning devices 200-1 to 200-n may be configured to share the learning results in the machine learning devices 200-1 to 200-n. By doing so, a further optimal model can be constructed.

In the embodiment of the present invention, although the case in which the transfer functions of the IIR filters 1092 and 1102 are quadratic functions has been described as an example, the transfer function is not limited to the quadratic function as described above in the embodiment. The transfer function may be a cubic function or a higher-order function.

EXPLANATION OF REFERENCE NUMERALS

10, 10A: Control device
100: Servo control device
101: Position command creation unit
102: Subtractor
103: Position control unit
104: Adder
105: Subtractor
106: Velocity control unit
107: Adder
108: Integrator
109: Velocity feedforward calculation unit
110: Position feedforward calculation unit
200: Machine learning device
201: State information acquisition unit
202: Learning unit
203: Action information output unit
204: Value function storage unit
205: Optimization action information output unit
300: Servo motor
400: Control target
500: Network

What is claimed is:

1. A machine learning device configured to perform machine learning related to optimization of coefficients of a transfer function of an IIR filter with respect to a servo control device configured to control a servo motor configured to drive an axis of a machine tool, a robot, or an industrial machine using feedforward control by a feedforward calculation unit having the IIR filter, wherein
the machine learning device represents a zero-point at which the transfer function of the IIR filter is zero and a pole at which the transfer function diverges infinitely in polar coordinates using a radius r and an angle $\theta$, respectively, and searches for and learns, within a predetermined search range, the radius r and the angle $\theta$ to thereby perform the optimization of the coefficients of the transfer function of the IIR filter, and
the machine learning device further comprises:
a state information acquisition unit configured to acquire, from the servo control device, state information including a servo state including at least a position error and the transfer function of the feedforward calculation unit by causing the servo control device to execute a predetermined machining program;
an action information output unit configured to output action information including adjustment information of the coefficients of the transfer function included in the state information to the servo control device;
a reward output unit configured to output a value of a reward of reinforcement learning based on the position error included in the state information; and
a value function updating unit configured to update an action value function on the basis of the value of the reward output by the reward output unit, the state information, and the action information.

2. The machine learning device according to claim 1, wherein
the search range of the radius r is defined on the basis of an attenuation factor, and the search range of the angle $\theta$ is defined on the basis of a vibration suppression frequency.

3. The machine learning device according to claim 1, wherein
the searching of the zero-point is performed prior to the searching of the pole.

4. The machine learning device according to claim 1, wherein
the pole is fixed when searching for the zero-point.

5. The machine learning device according to claim 1, wherein
the searching of the angle $\theta$ is performed prior to the searching of the radius r.

6. The machine learning device according to claim 1, wherein
the radius r is fixed to a fixed value when searching for the angle $\theta$.

7. The machine learning device according to claim 1, wherein
the zero-point is represented by a complex number and a conjugate complex number thereof.

8. The machine learning device according to claim 1, wherein
the feedforward calculation unit is a velocity feedforward calculation unit or a position feedforward calculation unit.

9. The machine learning device according to claim 1, wherein the feedforward calculation unit is a velocity feedforward calculation unit, the machine learning device further includes a position feedforward calculation unit having the IIR filter, and the optimization of the transfer function of the IIR filter of the velocity feedforward calculation unit is performed prior to the optimization of the transfer function of the IIR filter of the position feedforward calculation unit.

10. The machine learning device according to claim 1, wherein the reward output unit outputs the value of the reward on the basis of an absolute value of the position error.

11. The machine learning device according to claim 1, further comprising:

an optimization action information output unit configured to generate and output correction information of the coefficients of the transfer function of the feedforward calculation unit on the basis of the value function updated by the value function updating unit.

12. A control device comprising:

a machine learning device configured to perform machine learning related to optimization of coefficients of a transfer function of an IIR filter; and a servo control device configured to control a servo motor configured to drive an axis of a machine tool, a robot, or an industrial machine using feedforward control by a feedforward calculation unit having the IIR filter, wherein the machine learning device represents a zero-point at which the transfer function of the IIR filter is zero and a pole at which the transfer function diverges infinitely in polar coordinates using a radius r and an angle θ, respectively, and searches for and learns, within a predetermined search range, the radius r and the angle θ to thereby perform the optimization of the coefficients of the transfer function of the IIR filter, and the machine learning device further comprises:

a state information acquisition unit configured to acquire, from the servo control device, state information including a servo state including at least a position error and the transfer function of the feedforward calculation unit by causing the servo control device to execute a predetermined machining program;

an action information output unit configured to output action information including adjustment information of the coefficients of the transfer function included in the state information to the servo control device;

a reward output unit configured to output a value of a reward of reinforcement learning based on the position error included in the state information; and a value function updating unit configured to update an action value function on the basis of the value of the reward output by the reward output unit, the state information, and the action information.

13. The control device according to claim 12, wherein the machine learning device is included in the servo control device.

14. A machine learning method of a machine learning device configured to perform machine learning related to optimization of coefficients of a transfer function of an IIR filter with respect to a servo control device configured to control a servo motor configured to drive an axis of a machine tool, a robot, or an industrial machine using feedforward control by a feedforward calculation unit having the IIR filter, wherein the machine learning method involves representing a zero-point at which the transfer function of the IIR filter is zero and a pole at which the transfer function diverges infinitely in polar coordinates using a radius r and an angle θ, respectively, and searching for and learning, within a predetermined search range, the radius r and the angle θ to thereby perform the optimization of the coefficients of the transfer function of the IIR filter, and the machine learning method further comprises:

acquiring, from the servo control device, state information including a servo state including at least a position error and the transfer function of the feedforward calculation unit by causing the servo control device to execute a predetermined machining program;

outputting action information including adjustment information of the coefficients of the transfer function included in the state information to the servo control device;

outputting a value of a reward of reinforcement learning based on the position error included in the state information; and updating an action value function on the basis of the value of the reward, the state information, and the action information.

\* \* \* \* \*